United States Patent
Happ

(10) Patent No.: US 6,199,043 B1
(45) Date of Patent: *Mar. 6, 2001

(54) CONVERSATION MANAGEMENT IN SPEECH RECOGNITION INTERFACES

(75) Inventor: Alan J. Happ, Raleigh, NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/880,819

(22) Filed: Jun. 24, 1997

(51) Int. Cl.[7] .............. G10L 13/00; G10L 15/00
(52) U.S. Cl. .............. 704/272; 704/260; 704/275
(58) Field of Search .............. 704/275, 231, 704/270, 251, 276, 272, 260

(56) References Cited

U.S. PATENT DOCUMENTS

| | | | |
|---|---|---|---|
| 4,468,204 | 8/1984 | Scott et al. | 434/309 |
| 4,701,130 | 10/1987 | Whitney et al. | 434/118 |
| 4,736,296 | 4/1988 | Katayama et al. | 704/8 |
| 5,195,031 | 3/1993 | Ordish | 705/37 |
| 5,223,828 | * 6/1993 | McKiel, Jr. | 395/2.6 |
| 5,357,596 | * 10/1994 | Takebayashi et al. | 704/275 |
| 5,500,919 | * 3/1996 | Luther | 395/2.69 |
| 5,526,407 | * 6/1996 | Russell et al. | 704/379 |
| 5,615,296 | * 3/1997 | Stanford et al. | 704/201 |
| 5,748,841 | * 5/1998 | Morin et al. | 704/257 |
| 5,978,835 | * 11/1999 | Ludwig et al. | 709/204 |

FOREIGN PATENT DOCUMENTS

| | | | |
|---|---|---|---|
| 236194 | 9/1987 | (EP) . | |
| 2719401 | 11/1995 | (FR) | G06F/19/00 |
| 06161704 | 6/1994 | (JP) . | |
| 06209475 | 7/1994 | (JP) | H04N/7/113 |
| 07261793 | 10/1995 | (JP) | G10L/3/00 |
| 07261966 | 10/1995 | (JP) | G06F/3/14 |
| 07325776 | 12/1995 | (JP) . | |
| WO 9524103 | 9/1995 | (WO) . | |

* cited by examiner

Primary Examiner—Richemond Dorvil
(74) Attorney, Agent, or Firm—Quarles & Brady LLP

(57) ABSTRACT

A first graphical user interface for a video environment display is generated. A second graphical user interface for a synthesized environment display is generated. An audio output interface for audibly transmitting audio information associated with the first and second graphical user interfaces is generated. An audio input interface for receiving audible information as an input for the speech recognition interface is generated. The context is separated from the content by providing video and synthesized environments having different but complementary functions.

11 Claims, 2 Drawing Sheets

CONVERSATION MANAGEMENT IN SPEECH RECOGNITION INTERFACES

BACKGROUND OF THE INVENTION

1. Field of the Invention

This invention relates to the field of speech recognition interfaces of computer apparatus and the like, and in particular, to conversation management in such speech recognition interfaces.

2. Description of Related Art

One goal of a computerized interview (clinical assessments, structured interviews, and other individualized indicators) is to maintain the quality of the replaced human-to-human contact. During the interview, the interviewer plays different roles, e.g. test administrator, tester and observer, and the client must understand when the roles change. In human face-to-face interview, the verbal, situational, and paralinguistic cues generally suffice for a smooth transition among the different roles for the interviewer and client. While the rules for conversation are known (although they are difficult to express) to the conversants in a face-to-face dialogue, they are not for face-to-interface dialogues. The "rules" or "etiquette" for a computerized interview have not been established. There are two problems in particular which usually occur in a computerized conversation, namely: when to talk, referred to as the turn taking problem; and, how to talk, referred to as the vocabulary problem.

Persons do not know when to talk in a computerized conversation. A computerized conversation is not like a face-to-face conversation in which the conversants use paralinguistic cues, for example pitch changes and tone, and nonverbal cues, for example, facial expressions, to indicate when it is appropriate for the other person to talk. Moreover, many computer systems do not understand interruptions. In a face-to-face interview, the client can interrupt the interviewer at any time to ask for clarification or to maintain the conversation. This will be a problem until natural language programs can be used effectively in a conversation.

Persons do not know how to speak in a computerized conversation. Speaking to a voice recognition system is not like a face-to-face conversation in which the language has few constraints. On the other hand, generally, in a face-to-interface interview, the speaker will have to be trained how to speak. Sometimes the speaker must speak discretely, but, even with continuous speech, the vocabulary is limited.

Systems that administer tests are not new, however, the additional component of a conversational interview is new. Some kiosks have interactive sessions but they do not generally use voice recognition and don't attempt to initiate a conversation. When a video environment is used in a kiosk interaction, the end user makes choices from a touch screen or other type of selection button. Additionally, kiosk interaction is typically kept as short as possible. Part of the reason for that brevity may be that people tire relatively easily of that style of interaction.

The IBM® Human Center enables conversational computing. An actor's output and recognition can be programmed through the Personality Services and Actor Services components. Even so, the IBM® Human Center does not address what should be in the dialogue or how to manage the conversation.

Finally, there is a large body of research into non-verbal communication and discourse analysis which is pertinent to this field. Reference may be made to: Druckman, D., Rozelle, R. M., & Baxter, J. C., (1982). *Nonverbal Communication: Survey, Theory and Research*, Sage Library of Social Research (139), Beverly Hills: Sage Publications, Inc.; and, [2] Reichman, R. (1985). *Getting Computers to Talk Like You and Me*, Cambridge, Mass.: The MIT Press.

SUMMARY OF THE INVENTION

In accordance with an inventive arrangement, the solution to these problems is a method which for the first time allocates functions in the user interface to support the goals of the computerized interview. Such a user interface is described herein in the context of conversation management, specifically applied to an interview/assessment dialogue. The method allocates video and speech for different purposes to cue the client or end user when to speak, which alleviates the turn taking problem. The method also allocates video and speech to cue the client or end user how to speak, alleviating the vocabulary problem. Basically, the method employs different technologies to establish conditions that clearly inform the client or end user when and how to speak during a fairly complex situation, the interview.

The context of the interview affects the outcome as much as the content of the assessment tool. The complexity of the context was captured by Reichman, above, who noted that for conversants to follow a conversation, they must share not only common situational knowledge and common semantic reference, they must also share considerable knowledge about the structure of the conversation itself. Video (for example,.AVI files) and recorded speech (for example, .WAV files) are allocated for setting the context of the conversation, or in other words, setting the situational knowledge and references.

The method employs both recorded speech, delivered by a video actor, and synthesized speech, delivered by a synthesized actor, to structure the conversation. In this regard, it is expected that the video actor will use more natural, colloquial speech, and accordingly, speech recognition would not be appropriate for the client's or end user's responses because such responses can also be expected to use more natural, colloquial speech. If the video actor elicits a response from the client or end user, the response would more appropriately be recorded, but not necessarily interpreted by a voice recognition program. Preferably, the video actor would pass control of the interface, and the conversation, to the synthesized actor.

The synthesized actor would ask an appropriate question in more carefully controlled, non colloquial speech. The client or end user can then be expected to respond with a more carefully selected and limited vocabulary, for which speech recognition would be most appropriate.

Finally, the method employs a unique layout of the screen to support both the situational context and the conversation.

A method for managing conversation in a speech recognition interface, in accordance with an inventive arrangement, comprises the steps of: generating a first graphical user interface for a video environment display; generating a second graphical user interface for a synthesized environment display; generating an audio output interface for audibly transmitting audio information associated with the first and second graphical user interfaces; and, generating an audio input interface for receiving audible information as an input for the speech recognition interface.

The method can also comprise the step of arranging the video and synthesized environment displays for substantially non overlapping presentation or arranging the video and synthesized environment displays for at least partly overlapping presentation.

The method can further comprise the steps of: originating an information content in at least one of captured video and live video transfer; and, originating an information content for the synthesized environment in an acted performance and text-to-speech conversion of speech from the performance.

The method can also comprise the steps of: establishing a context for the speech recognition interface with the video environment; and, providing examples of how to speak and examples of a proper vocabulary with the synthesized environment.

The method can also comprise the steps of: providing predetermined instructions for using the speech recognition interface with the video environment; and, answering questions and supplying information in response to the received audible information with the synthesized environment.

The method can also comprise the steps of: providing audible information from the video environment in accordance with rules of human-to-human conversation in a lecture format; and, providing audible information from the synthesized environment in accordance with rules of human-to-computer conversation.

The method can also comprise the steps of: initiating new topics, taking turns from the synthesized acting performance and giving turns to the synthesized acting performance with the video environment; and, taking turns from the video display, taking turns from the audio input interface, giving turns to the video display and giving turns to the audio input interface with the synthesized environment.

The method can also comprise the steps of: administering an interview with the speech recognition interface; and, managing navigation through the interview with the synthesized environment.

DETAILED DESCRIPTION OF THE PREFERRED EMBODIMENTS

Figure 1:
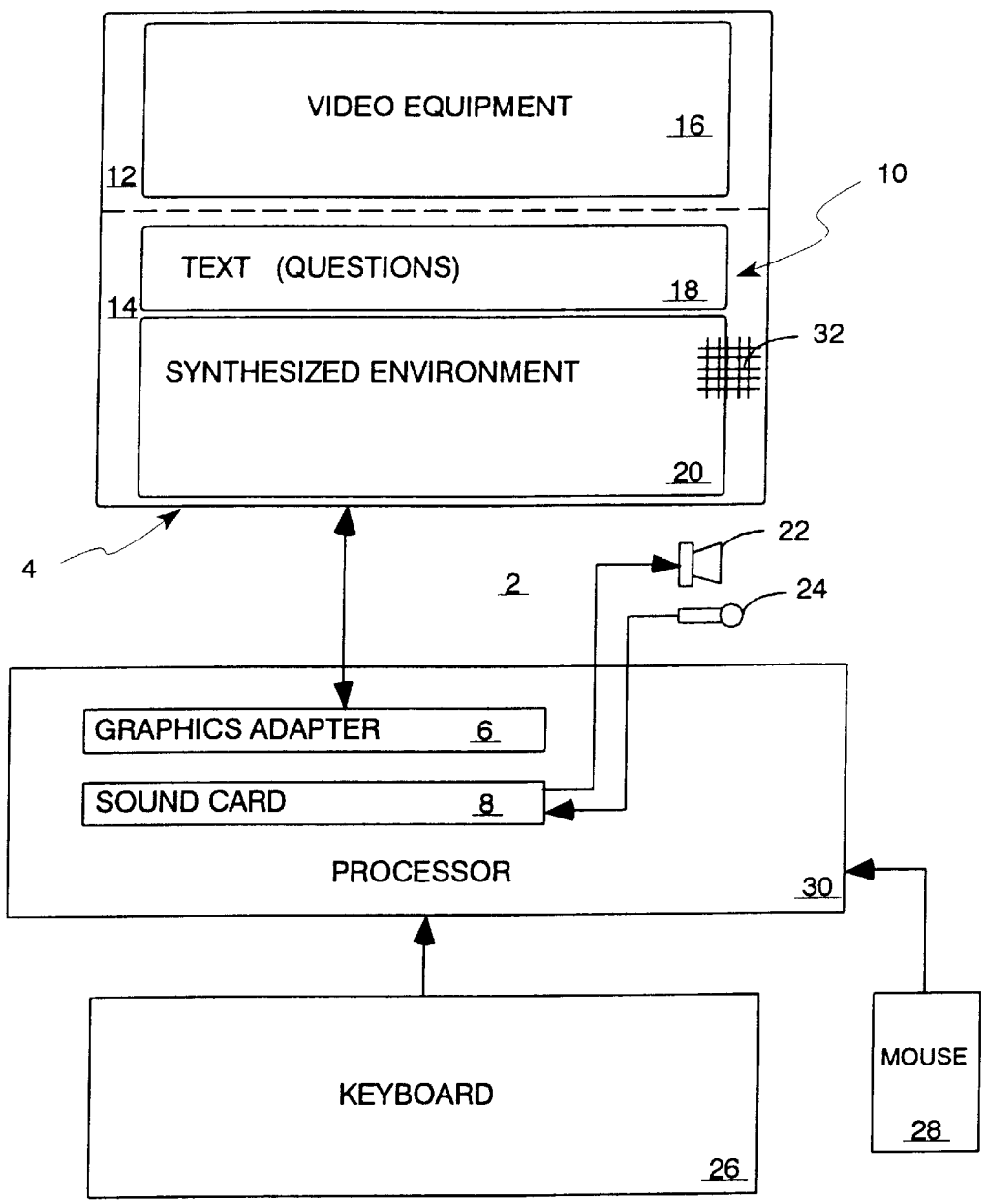
FIG. 1 is a video display screen generated by a graphical user interface, together with a computer apparatus, in accordance with an inventive arrangement.

The manner in which a method according to an inventive arrangement employs different technologies to establish conditions that clearly inform the client or end user when and how to speak during a fairly complex situation, the interview, is explained in connection with FIGS. 1 and 2. The functions of the technologies can be advantageously allocated to support a complex computer conversational interface such as the interview. FIG. 1 illustrates an advantageous arrangement of information and visual cues on a video display screen.

With reference to FIG. 1, a computer apparatus 2 comprises a monitor 4 having a video display screen 10, generated by at least one graphical user interface in the computer apparatus, generated for example by a graphics adapter 6 in a central processor 30. At least one audio output interface is generated by a sound card 8 in the processor and a speaker 22. At least one audio input interface is generated by a microphone 24 and the sound card 8.

The display screen 10 is divided into a first section 12 and second section 14, divided by the dashed line. The first section 12 is for the video environment 16. The second section 14 has a first portion 18 for text, for example questions. The second section 14 has a second portion 20 for the synthesized environment. The video environment portion 16 is for pictures of real people in a real setting, for example, doctors in a clinic setting or a psychiatrist in an office. The doctor can refer to questions which appear below, in a second portion 18. The doctor's speech can include references to real world contexts. The synthesized environment 20 can show a synthesized actor with text to speech capability. The goal is to complete the interview questions and the scope of the synthesized actor's comments are limited to the interview questions.

Although FIG. 1 shows the display screen divided into upper and lower sections, it should be appreciated that the video and synthesized actors can appear in any location on the display screen, or even as a substantially transparent foreground figure. The format of the screen layout can be arranged differently for different kinds of interactive sessions.

The computer apparatus is further provided with input devices, for example, in the form of a keyboard 26, a mouse 28 and a touch screen 32, indicated schematically by a small, partial cross hatch pattern. A computer apparatus in the general configuration illustrated in FIG. 1 is well known and available from numerous manufacturers. Speech recognition software for programming such computer apparatus is also available from numerous manufacturers.

It is important to appreciate the differences between the various parameters of the respective video and synthesized environments, as well as the allocation of functions between these environments. These parameters and allocations include: content; purpose; role of client or end user; role of interviewer; and, turn taking rules. Reference should be made to the conversation flow diagram 40 in FIG. 2 in connection with the following explanation of the parameters and allocations. Flow diagram 40 includes a block 42 for the video actor's turn, a block 44 for the synthesized actor's turn and a block 46 for the client's or end user's turn. In the screen arrangement of FIG. 1, the video actor's turn takes place in 16 and the synthesized actor's turn takes place in portion 20. In accordance with this arrangement, control can be passed between blocks 42 and 44 and between blocks 44 and 46. Blocks 42 and 46 can interrupt one another and blocks 44 and 46 can interrupt one another, but blocks 42 and 44 do not interrupt one another.

Figure 2:
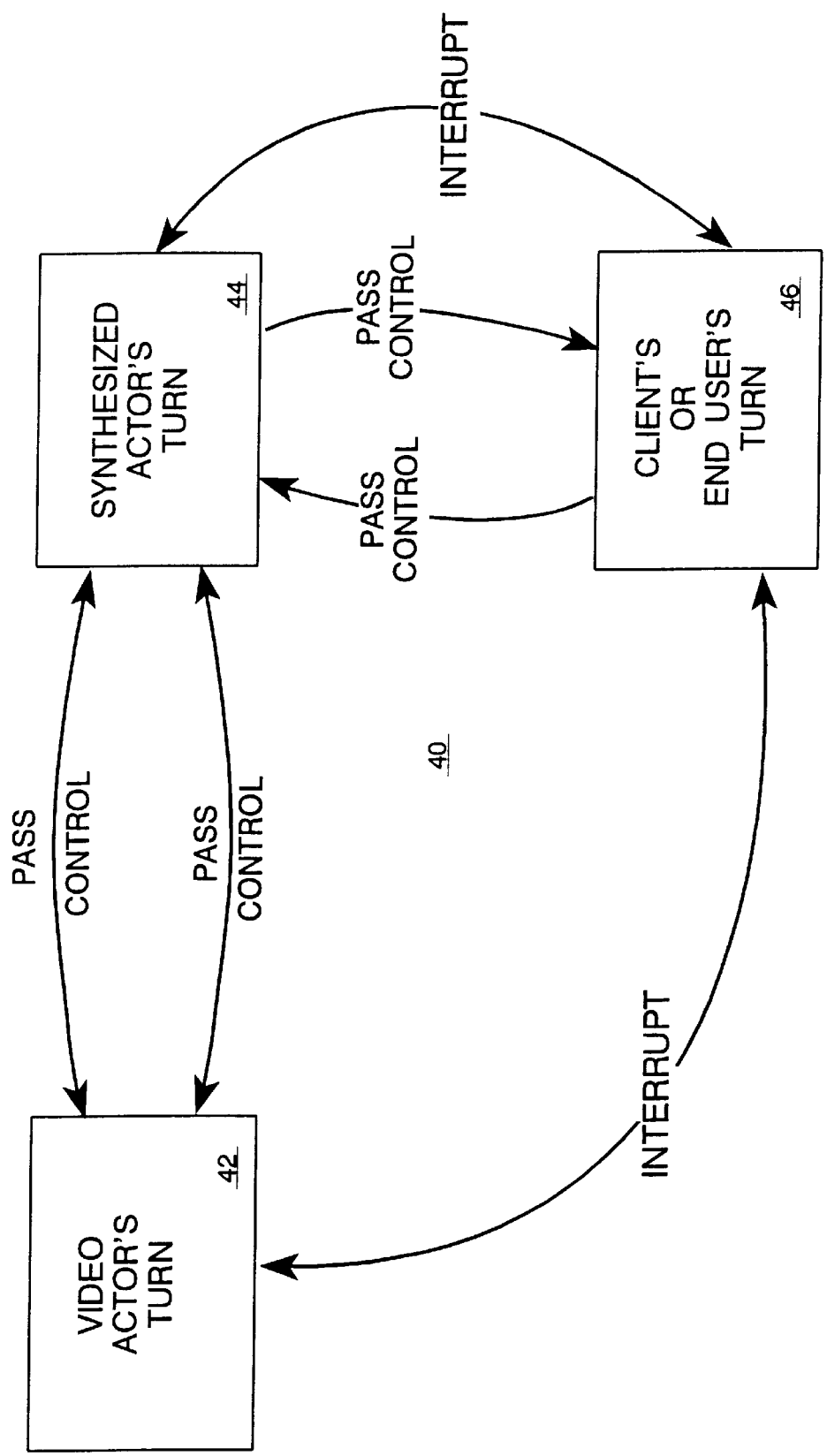
FIG. 2 is a diagram useful for explaining conversation flow in a speech recognition interface in accordance with the inventive arrangement.

The flow diagram in FIG. 2 assumes that the client or end user will initiate the conversation. This means that the video and synthesized actors are, in effect, listening until the client or end user speaks or otherwise undertakes an initiating action. In accordance with the flow diagram, the client or end user interacts primarily with the synthesized actor. The synthesized actor controls the conversation and gathers information. The video actor provides information such as welcoming, setting, purpose, direction and debriefing. A turn consists of verbal and non verbal behavior used to accept the turn, contribute to the conversation, by a statement or question, and pass control to the next party in the conversation. Non verbal behavior can consist of actions, for example the actor or client or end user presses a button, and other body movements, for example head, eye, facial, hand and body position movement, to cue the start, continuation or end of a statement or question. Non verbal behavior can be combined with verbal behavior, that is speaking, to provide non verbal cues such as raising the eyebrows to signal speech onset, looking towards the target of the speech and changing the voice to signal completion. Interrupting is a forced turn taking. If the video actor is interrupted by the client or end user, the video actor will pass control to the synthesized actor, which can return control to the video actor, respond to the interruption or return control back to the client or end user.

The content of the video environment is in captured files, for example, .AVI and .WAV, or live video transfer. The content of the synthesized environment is provided by the services of an actor and text-to-speech conversion.

The purpose of the video environment is to set the context or environment, as for example, in a doctor's office, in a clinic, in the forest and the like. The audio portion also supports the context. The video environment may be used, for example, to tell a story or describe administrative details. The video environment is intended to make the client or end user feel at ease. The video environment is primarily an output mode, being the source of the interview and the test. The purpose of the synthesized environment is to control the content of the assessment tool. This can be accomplished by providing examples of how to speak and the proper vocabulary to use. For example, the synthesized actor will use simple words in asking a question with the expectation of a simple answer. An example of a limited question is, "Do you want to go back to another information about question?" This can be contrasted with a more open and problematic question, such as, "Which question or questions would you like to revise?"

The role of the client in the video environment is to listen to instructions, as well as to watch and learn about the situation and the test. The role of client in the synthesized environment is to answer questions and interact with the system, controlling the flow of the interview.

The role of the interviewer in the video environment, who is a real person, is to follow the rules of human-to-human conversation in a lecture format, in the nature of a television-like interaction. The role of the interviewer in the synthesized environment, who is a synthesized actor, is to follow the rules for human-to-computer conversation. In an ideal situation, the synthesis would be so complete as to appear to be like a human-to-human interaction.

The turn taking rules for the video environment include: initiates new topics; taking turns from the actor; and, giving speaking turns to the actor. The turn taking rules for the synthesized environment include: completing interview; managing navigation through the assessment; taking turn from the video and from the client or end user; and, giving turns to the video and the client or end user.

It should also be appreciated that these concepts can also be applied to situations other than interviews, for example distance education, in which the client, for example a student, must work within a conversational context and the test content can be separated from it.

Since it is known that people will respond with language similar to that used by the interviewer and that the vocabulary of voice recognition systems is limited, the actor would use a restricted language and speak discretely to be an example of how the client or end user should talk to the system. The language of the actors in the video segment could be more formal or more colloquial, more relaxed or more animated, depending on the context.

These concepts could also be applied in similar situations, for example, distance education, in which the client (e.g., student) must work within a conversational context and the test content can be separated from it, and job skills sessions, just to name two.

A job skills session managed in accordance with the inventive arrangement can be conducted as follows. Suppose a client or end user is interested in learning about skills required to enhance their career. When the client or end user initiates the session, the video actor would welcome the client or end user, record non recognizable information, explain about the company's career enhancement program and describe the manner in which the synthesized actor would help the client or end user complete several skill inventories.

Non-recognizable information includes those items that have too large a domain for present speech recognition systems. This can include information such as name, address, and place of birth. The video actor would ask for the information, which would be recorded. The video actor passes control to the synthesized actor, which could ask for verification. The synthetic actor might say, for example, "Please listen to the recording of your name and address. Say or press "OK" if it is clear and correct. Say or press "Retry" if you want to record your name and address again." When the client or end user responds, the synthesized actor says "Thank you.", and passes control back to the video actor. The video actor responds appropriately, either asking for the information again or continues.

The synthesized actor has the vocabulary for completing each test, for example the Myers-Briggs test or one of the many vocational guidance tests, as well as some of the terminology of the specific industry. Accordingly, the synthesized actor can then recognize navigation words, words in the test and alternative ways to answer a question, such as "B", "the second one" or "fourteen ninety two".

When general, non test information is needed, the synthesized actor would pass control back to the video actor. This might be between sections of a test, between tests, or very likely, after completion of the tests. A simple method to do this is to have the synthesized actor look towards the video actor, say his or her name, and continue looking at the video actor until the video actor begins to speak. It can be noted that this is the same general etiquette that a speaker at a lectern uses to pass control to another speaker. The old speaker looks at the new speaker, announces his or her name, waits for the new speaker to get to the lectern, and recognizes that the new speaker now has control of the meeting, for example with a handshake.

The interface can be seen to encourage interaction between the actors and the client or end user. When the testing is completed, the synthesized actor returns control back to the video actor. The video actor then closes the session with the client or end user.

In a speech recognition system, managing the human-computer conversation requires more than just knowing what was said. The inventive arrangement taught herein advantageously separates the context from the content, for example in a complex interaction such as an interview situation, by providing video and synthesized environments having different but complementary functions.

What is claimed is:

1. A method for managing conversation in a speech recognition interface, comprising the steps of:

capturing video of a non-synthesized human video actor;

concurrently generating a first graphical user interface for displaying said captured video in a video environment display and a second graphical user interface for displaying a computer-synthesized actor in a synthesized environment display;

generating an audio output interface for audibly transmitting audio information associated with said first and second graphical user interfaces; and, generating an audio input interface for receiving audible information as an input for said speech recognition interface.

2. The method of claim 1, comprising the step of arranging said video and synthesized environment displays for substantially non overlapping presentation.

3. The method of claim 1, comprising the step of arranging said video and synthesized environment displays for at least partly overlapping presentation.

4. The method of claim 1, comprising the steps of:

originating an information content in at least one of captured video and live video transfer; and, originating an information content for said synthesized environment in an acted performance and text-to-speech conversion of speech from said performance.

5. The method of claim 1, comprising the steps of:

establishing a context for said speech recognition interface with said video environment; and, providing examples of how to speak and examples of a proper vocabulary with said synthesized environment.

6. The method of claim 1, comprising the steps of:

providing predetermined instructions for using said speech recognition interface with said video environment; and, answering questions and supplying information in response to said received audible information with said synthesized environment.

7. The method of claim 1, comprising the steps of:

providing audible information from said video environment in accordance with rules of human-to-human conversation in a lecture format; and, providing audible information from said synthesized environment in accordance with rules of human-to-computer conversation.

8. The method of claim 1, comprising the steps of:

initiating new topics, taking turns from said synthesized acting performance and giving turns to said synthesized acting performance with said video environment; and, taking turns from said video display, taking turns from said audio input interface, giving turns to said video display and giving turns to said audio input interface with said synthesized environment.

9. The method of claim 1, comprising the step of administering an interview with said speech recognition interface.

10. The method of claim 9, comprising the step managing navigation through said interview with said synthesized environment.

11. The method according to claim 1, wherein said captured video is one of recorded video of a non-synthesized human video actor and live transfer video of a non-synthesized human video actor.

\* \* \* \* \*